US008626435B2

(12) United States Patent  
Gardea et al.

(10) Patent No.: US 8,626,435 B2  
(45) Date of Patent: Jan. 7, 2014

(54) GPS FILTER ALGORITHM

(75) Inventors: Raymond Gardea, Winston-Salem, NC (US); James Gwynn, Greensboro, NC (US); John Bate, Oak Ridge, NC (US)

(73) Assignee: Volvo Group North America LLC, Greensboro, NC (US)

( * ) Notice: Subject to any disclaimer, the term of this patent is extended or adjusted under 35 U.S.C. 154(b) by 153 days.

(21) Appl. No.: 12/920,315

(22) PCT Filed: Feb. 28, 2008

(86) PCT No.: PCT/US2008/002673  
§ 371 (c)(1),  
(2), (4) Date: Aug. 30, 2010

(87) PCT Pub. No.: WO2009/108150  
PCT Pub. Date: Sep. 3, 2009

(65) Prior Publication Data  
US 2011/0018760 A1    Jan. 27, 2011

(51) Int. Cl.  
*G01C 21/00* (2006.01)
(52) U.S. Cl.  
USPC ............... 701/408; 701/14; 701/16; 701/454; 701/472; 701/20; 701/468; 701/517; 701/469; 342/357.29; 342/357.31; 342/357.44; 342/357.64; 340/632; 340/947; 340/988; 340/990; 340/979
(58) Field of Classification Search  
USPC .................................................. 701/16, 454  
See application file for complete search history.

(56) References Cited

U.S. PATENT DOCUMENTS

| | | | | |
|---|---|---|---|---|
| 5,361,212 A | * | 11/1994 | Class et al. | ........................ 701/16 |
| 5,436,632 A | * | 7/1995 | Sheynblat | ................ 342/357.64 |
| 5,504,492 A | * | 4/1996 | Class et al. | ............... 342/357.31 |
| 5,596,328 A | * | 1/1997 | Stangeland | .............. 342/357.44 |
| 5,600,329 A | * | 2/1997 | Brenner | .................... 342/357.44 |
| 5,608,393 A | * | 3/1997 | Hartman | ........................ 340/988 |
| 5,610,616 A | * | 3/1997 | Vallot et al. | .............. 342/357.44 |
| 6,067,484 A | * | 5/2000 | Rowson et al. | .................. 701/16 |
| 6,456,938 B1 | * | 9/2002 | Barnard | ........................ 701/454 |
| 6,490,524 B1 | | 12/2002 | White et al. | |
| 6,522,698 B1 | | 2/2003 | Irving et al. | |
| 6,944,541 B2 | | 9/2005 | Pasturel et al. | |
| 7,069,021 B2 | | 6/2006 | Lehtinen | |
| 7,219,013 B1 | | 5/2007 | Young et al. | |
| 2007/0072625 A1 | | 3/2007 | Fournier et al. | |

OTHER PUBLICATIONS

Written Opinion of the International Search Authority mailed Aug. 1, 2008.

* cited by examiner

*Primary Examiner* — Redhwan K Mawari  
(74) *Attorney, Agent, or Firm* — Potomac Patent Group PLLC

(57) ABSTRACT

A method for determining location such as vehicle location receives data at a predetermined frequency, validates the received data, stores the received data based on the validation and computes a location based on the stored data. The validation includes verifying a presence of particular data substrings within the received data, verifying a presence of a plurality of data fields within each data substring, computing a parameter based on information contained in two of the plurality of data fields and comparing the computer parameter with a pre-defined threshold.

14 Claims, 4 Drawing Sheets

| Memory Location |
|---|
| F |
| E |
| D |
| C |
| B |
| A |
| 9 |
| 8 |
| 7 |
| 6 |
| 5 |
| 4 |
| 3 |
| 2 |
| 1 |
| 0 |

| Memory Location | Data String (16) | Data String (17) | Data String (18) | Data String (19) | Data String (20) | Data String (21) |
|---|---|---|---|---|---|---|
| F | 16 | 17 | 18 | 19 | 20 | 21 |
| E | 15 | 16 | 17 | 18 | 19 | 20 |
| D | 14 | 15 | 16 | 17 | 18 | 19 |
| C | 13 | 14 | 15 | 16 | 17 | 18 |
| B | 12 | 13 | 14 | 15 | 16 | 17 |
| A | 11 | 12 | 13 | 14 | 15 | 16 |
| 9 | 10 | 11 | 12 | 13 | 14 | 15 |
| 8 | 9 | 10 | 11 | 12 | 13 | 14 |
| 7 | 8 | 9 | 10 | 11 | 12 | 13 |
| 6 | 7 | 8 | 9 | 10 | 11 | 12 |
| 5 | 6 | 7 | 8 | 9 | 10 | 11 |
| 4 | 5 | 6 | 7 | 8 | 9 | 10 |
| 3 | 4 | 5 | 6 | 7 | 8 | 9 |
| 2 | 3 | 4 | 5 | 6 | 7 | 8 |
| 1 | 2 | 3 | 4 | 5 | 6 | 7 |
| 0 | 1 | 2 | 3 | 4 | 5 | 6 |

| Memory Location | Data String (16) | Data String (17) | Data String (18) | Data String (19) | Data String (20) | Data String (21) |
|---|---|---|---|---|---|---|
| F | 16 | 16 | 16 | 16 | 16 | 16 |
| E | 15 | 15 | 15 | 15 | 15 | 15 |
| D | 14 | 14 | 14 | 14 | 14 | 14 |
| C | 13 | 13 | 13 | 13 | 13 | 13 |
| B | 12 | 12 | 12 | 12 | 12 | 12 |
| A | 11 | 11 | 11 | 11 | 11 | 11 |
| 9 | 10 | 10 | 10 | 10 | 10 | 10 |
| 8 | 9 | 9 | 9 | 9 | 9 | 9 |
| 7 | 8 | 8 | 8 | 8 | 8 | 8 |
| 6 | 7 | 7 | 7 | 7 | 7 | 7 |
| 5 | 6 | 6 | 6 | 6 | 6 | 6 |
| 4 | 5 | 5 | 5 | 5 | 5 | 21 |
| 3 | 4 | 4 | 4 | 4 | 20 | 20 |
| 2 | 3 | 3 | 3 | 19 | 19 | 19 |
| 1 | 2 | 2 | 18 | 18 | 18 | 18 |
| 0 | 1 | 17 | 17 | 17 | 17 | 17 |

GPS FILTER ALGORITHM

BACKGROUND

This invention relates to tracking of vehicles and more particularly to a method for increasing the accuracy in determining the location of a vehicle.

Existing technology makes it possible to determine the approximate current location of a vehicle. Such information has proven useful in tracking vehicles which can be stationary or in motion. Any company or entity with a fleet of vehicles typically can monitor movement or location of one or more of its vehicles. GPS systems are utilized in determining vehicle location. GPS systems make use of orbiting satellites to provide the location information of vehicles such as trucks to an operations center of a trucking company for example.

The accuracy in determining the vehicle location depends on many factors including the number of satellites visible in the system for example. The factors may also include landscape features such as buildings, urban density, mountains or forested terrain for example. Other factors may include the selective availability (SA) feature of satellites which is an artificial falsification of the time in the transmitted satellite signal that is used by the United States military to (deliberately) introduce errors for non-military applications.

It has been observed that, for stationary vehicles for example, the location as determined by existing methods varies by as much as 200 to 500 meters from the actual vehicle location. It is, therefore, desirable to increase the reliability (and as a result, the accuracy) in locating a vehicle.

In exemplary embodiments, a method is provided for determining a vehicle location with a higher degree of accuracy.

SUMMARY

In one embodiment, a method for determining location such as vehicle location is disclosed. The method comprises receiving data at a predetermined frequency, validating the received data, storing the received data based on the validation and computing a location based on the stored data. The validation includes verifying a presence of particular data substrings within the received data, verifying a presence of a plurality of data fields within each data substring, computing a parameter based on information contained in two of the plurality of data fields and comparing the computer parameter with a pre-defined threshold.

In another embodiment, a system for determining a vehicle location is disclosed. The system comprises a communication means for receiving data representing vehicle location, a processing means for determining validity of the received data and determining the vehicle location and a storage means for storing validated data. The processing means verifies a presence of a particular data substrings within the received data, verifies a presence of a plurality of data fields within each data substring, computes a parameter based on information contained in two of the plurality of data fields and compares the computed parameter with a pre-defined parameter threshold.

BRIEF DESCRIPTION OF THE DRAWINGS

The several features, objects, and advantages of Applicants' invention will be understood by reading this description in conjunction with the drawings, in which:

FIGS. 3A-3C illustrate various memory arrangements for storing received location information.

DETAILED DESCRIPTION

The following description of the implementations consistent with the present invention refers to the accompanying drawings. The same reference numbers in different drawings identify the same or similar elements. The following detailed description does not limit the invention. Instead, the scope of the invention is defined by the appended claims.

GPS systems (in vehicles) receive signals from positioning satellites to determine the vehicle location. GPS chipsets decode the signals and process the information. The chipsets generate data strings representative of the vehicle location that may be represented according to one of many protocols/standards. One protocol/standard that is currently in use is the NMEA-0183 (National Maritime Electronic Association) standard that can be used to determine location of a vehicle. The NMEA standard specifies a plurality of strings which include, but are not limited to, an RMC string and a GSA string. The RMC and GSA strings may also be referred to as substrings as they are a subset of the NMEA-0183 string for example. The terms, "RMC string" and "RMC substring" (as well as "GSA string" and "GSA substring") may be used interchangeably while referring to the same data item for purposes of this description. Some of the information contained in the RMC and GSA strings may also be duplicated in other strings that are included in the NMEA standard.

Figure 1:
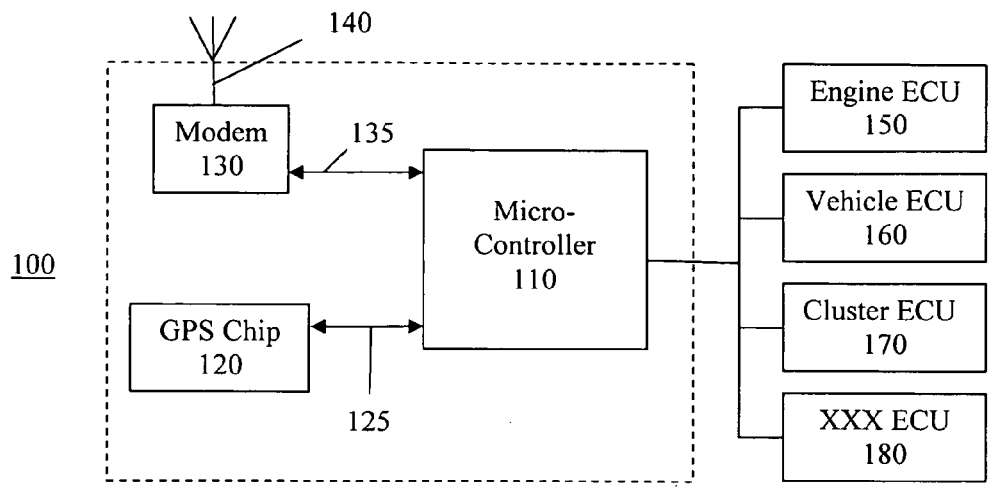
FIG. 1 illustrates an electronic control unit (ECU) of a vehicle.

FIG. 1 illustrates an electronic control unit (ECU) 100 of a vehicle. ECU 100 includes a micro-controller 110, GPS chip 120, modem 130 and antenna 140. In exemplary embodiment, GPS chip 120 may generate a data string. The data string may be, but is not limited to, a NMEA string according to a NMEA-0183 standard for example. The data string may also be another type of proprietary string or a binary interface.

GPS chip 120 may communicate with micro-controller 110 via interface 125. Interface 125 may be, but is not limited to, a RS-232 interface. GPS chip 120 may communicate the NMEA-0183 data string (or other proprietary string) via interface 125 to micro-controller 110. Another interface 135 may provide communication between micro-controller 110 and modem 130. Interface 135 may also be, but is not limited to, a RS-232 interface. Modem 130 may transmit and/or receive data to a remote or central location. The vehicle location may be determined at the remote location based on data received from ECU 100. Exemplary remote locations may include, but are not limited to, an operations center or a back office of a shipping company that operates a fleet of trucks or that of a rental car company. The information from ECU 100 may be transmitted in known wireless manner to the remote location. ECU 100 may receive data such as instructions from the remote location.

ECU 100 (or, micro-controller 110) may also be connected to one or more other ECUs 150, 160, 170 and 180 via a vehicle data bus (The vehicle data bus may be, but is not limited to one of j1708, j1939, LIN, Flexray, etc). Other ECUs may include an engine ECU 150, a vehicle ECU 160, a cluster ECU 170 and/or other type of ECU 180. ECU 100 is a gateway to the satellite or cell based back office whose purpose is to transfer information to and from the vehicle; Vehicle ECU 160 works more with vehicle body functions (such as converting wheel sensor pulses to road speed for example).

Exemplary embodiments utilize the RMC string and the GSA string, which originate in GPS chip 120 and may be sampled every second by the micro-controller 110. The sampling frequency is not limited to a second; it may be adjusted to a frequency other than every second.

A sample RMC string may have the following format: GPRMC, 114200.00, A, 3604.85806, N, 07958.12565, W, 000.2, 161.2, 070904, 006.8, W. A sample GSA string may have the following format: GPGSA, A, 3, 26, 29, 21, 22, ..., 06, ..., 2.6, 2.4, 2.2.

The data or information from the RMC and GSA strings (or, substrings) may be used to obtain a "fix" for each sample. The "fix" represents a location that the GPS chip 120 thinks is the location of the vehicle. The "fix" includes the current latitude (CLA), the current longitude (CLO), the current time (CT), the current horizontal dilution of precision (HDoP), the current vertical dilution of precision (VDoP) and the position dilution of precision (PDoP). The horizontal and vertical dilution of precision may be combined (or, summed) to form a probability factor (PF). That is, PF=HDoP+VDoP.

RMC and GSA strings provide the various parameters described above. The RMC substring may include position and time values (CLA, CLO and CT from above) and the GSA substring may include PDoP, HDoP, VDoP and the number of satellites, etc. Since PF=HDoP+VDoP, the probability factor is computed from parameters in the GSA substring.

Figure 2:
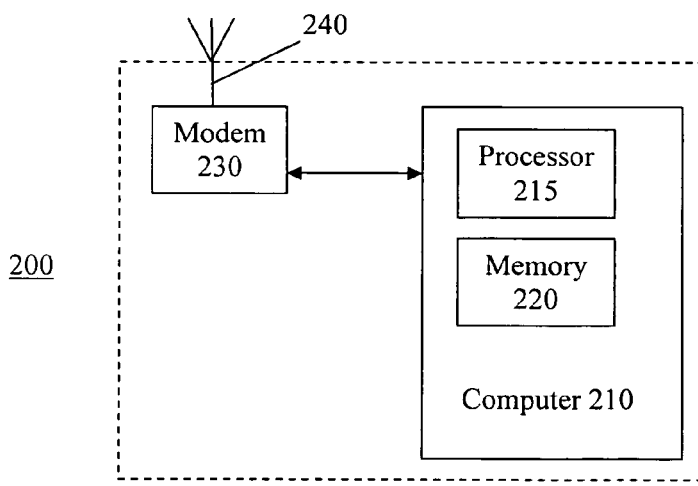
FIG. 2 illustrates an exemplary operations center for processing location information.

An operations center may receive the RMC and GSA substrings and determine the location of the vehicle based on the received data. FIG. 2 illustrates an exemplary operations center 200. Operations center 200 may include a computer 210, modem 230 and antenna 240. Computer 210 may be a general purpose computer having a processor 215 and memory 220. Computer 210 may be connected externally to modem 230 or modem 230 may be integrated within computer 210. Similarly, memory 220 may also be external to computer 210. Modem 230 may be utilized for receiving data from a vehicle. Processor 215 may compute the various parameters necessary to determine validity of the received data strings. Memory 220 may be utilized to store valid received data strings as well as pre-determined parameter and time thresholds.

Memory 220 may store the data strings (i.e. the RMC and GSA strings) as they are received at the operations center 200. Memory 220 may store a predetermined (or, pre-defined) number of the most recently received valid data strings. In an exemplary embodiment, memory 220 may store sixteen (16) of the most recently received valid data strings.

As described above, a received data string may include values representing current latitude (CLA), current longitude (CLO) and current time (CT) where the current time may represent the time at which the strings are generated or reported by GPS chip 120.

The values stored in memory 220 may include the latitude, longitude, time and probability factor that is computed from parameters in the received GSA string (i.e. PF=HDoP+VDoP). The data strings stored in memory 220 may form the basis for determining the current location of a vehicle. The current location may be determined by computing the average of the sixteen values.

The validity of the received string may determine whether or not the received string is stored in memory 220. A valid string may be placed in memory 220 while an invalid string may not be placed in memory 220. The validity may be based on the probability factor (PF). A pre-determined (or, pre-defined) probability factor threshold may be established. If the probability factor of a received data string satisfies the pre-defined threshold value, the received data string may be stored in memory 220.

An invalid string may result from not receiving all fields of data within the string(s) for example. It may also result from not receiving one of the RMC or GSA strings. It may result from a reduction in the number of satellites used. Invalid strings may also be generated as a result of a hardware failure.

In the example mentioned above, memory 220 may store sixteen valid data strings. If the next received string is valid, the received string may be placed in memory 220 replacing the oldest string in memory 220. While the use of sixteen samples is illustrated in exemplary embodiments, the invention is not limited to processing only sixteen samples. In other embodiments, a greater number (i.e. greater than sixteen) of samples may be processed.

FIG. 3A illustrates an exemplary memory 320 with sixteen locations represented by hexadecimal digits 0 to 9 and A to F. As data strings are received, their validity may be verified and they may be placed in memory locations starting with memory location 0 until sixteen such valid data strings are received and placed in locations 0 to 9 and A to F. Upon receipt of the next valid data string (number 17 in this case), the data strings may be pushed down by one memory location in memory 320 as shown in FIG. 3B. The oldest data string from memory location 0 may be removed and the newest received and verified data string may be placed in memory location F.

Other methods may be utilized to store valid data strings in memory 320 as illustrated in FIG. 3C. For example, after the first sixteen strings are placed in locations 0 to F, the next sixteen samples may be placed starting again with memory location 0 and continuing to memory location F. This process may be repeated. An exemplary method maintains the most recent sixteen valid data strings in memory 320 in exemplary embodiments regardless of the type of method utilized to store the data strings (i.e. whether that illustrated in FIG. 3B or that illustrated in FIG. 3C is utilized).

Upon the placement of a valid data string in memory 320, the average value of each of the parameters in the memory may be computed and this computed value may represent the current location of the vehicle.

In certain conditions, GPS chip 120 may not provide a data string such as if the vehicle travels within a tunnel or is underground. Modem 130 may not be able to communicate in such settings. When this occurs, the last valid location may be latched on for a predetermined period of time. Upon expiration of this predetermined time, an alarm or notification may be generated indicating that signals from the vehicle are not being received.

Figure 4:
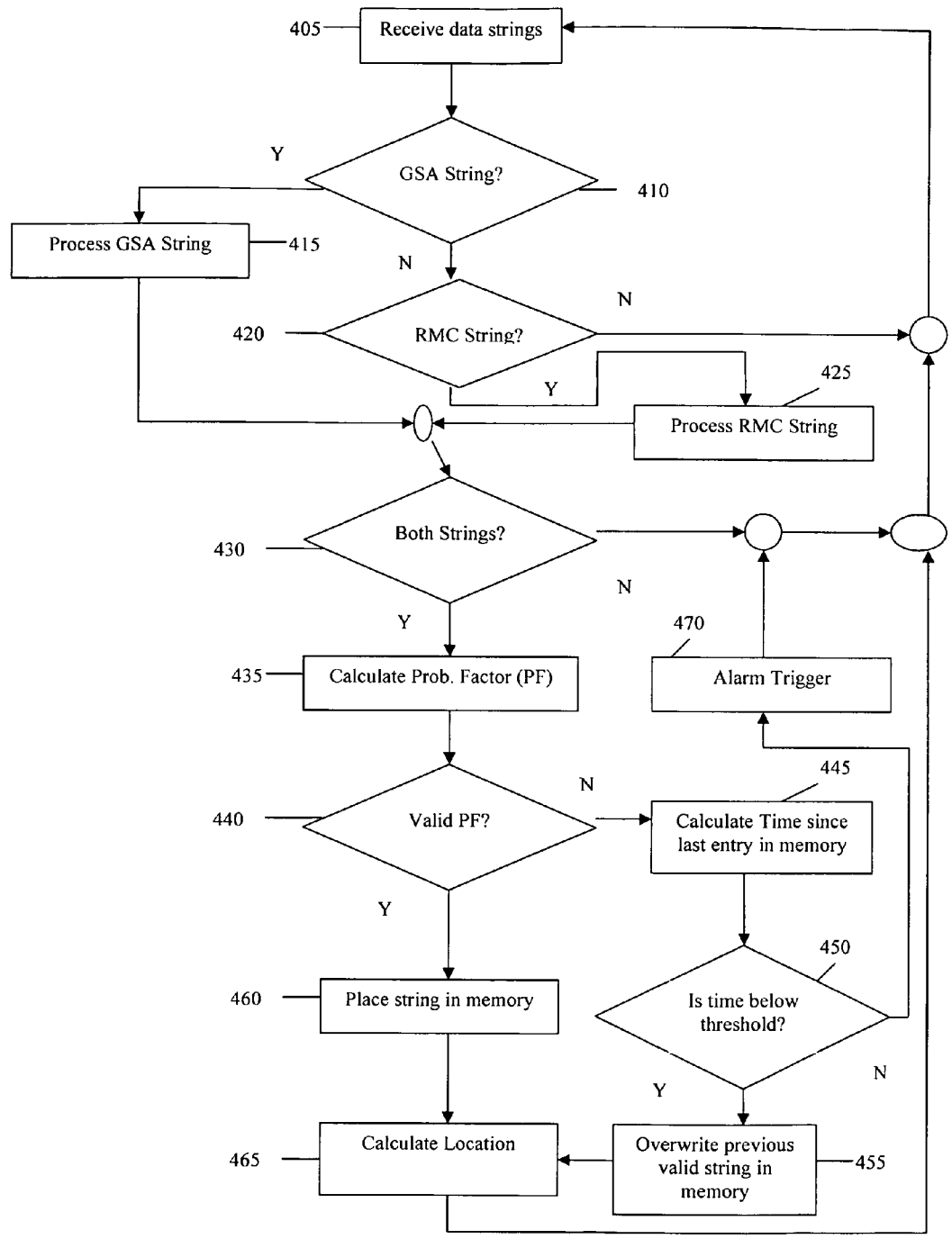
FIG. 4 illustrates a method according to exemplary embodiments.

A method or process 400 in accordance with exemplary embodiments is illustrated in FIG. 4. A data string may be received at step 405. The received string may be analyzed to determine if it is a GSA string at step 410. The string may be analyzed to determine if all fields (of a GSA string) are present for example. If the received string is a GSA string, the received string may be processed at 415.

If the received string is not a GSA string, it may be analyzed to determine if it is a RMC string at 420 (i.e., determine if all fields of a RMC string are present for example). If the received string is a RMC string, it may be processed at 425. If it is not a RMC string, then the process may return to 405. Upon processing of either a GSA string (415) or a RMC string (425), it may be determined whether both strings have been received at 430. If both strings have not been received, the process may return to step 405 to receive the next data string. As described previously, validity of a received string means receiving a complete valid GSA string and a complete valid RSC string.

If both strings have been received, the probability factor (PF) may be calculated at 435 (i.e. PF=HDoP+VDoP). The validity of the probability factor may be determined at 440. The probability factor may be compared to a predetermined threshold. The probability factor may be designated as being valid if it is less than the predetermined threshold value; the probability factor may be designated as being invalid if it is equal to or greater than the predetermined threshold value. In other embodiments, the string may be valid if it is greater than or equal to the threshold value and may be invalid if it is less than the threshold value.

If the probability factor is found to be valid, the string is placed in the memory at 460. If the probability factor is found not to be valid, the time difference between the present time and time of receipt of the last valid entry (that was placed in the memory) may be determined at 445. The time difference may be analyzed at 450. If the time difference is less than or equal to (i.e. at or below) a predetermined threshold value, the last valid string that was received may be placed in memory at 455. That is, the last stored valid entry may be overwritten by itself (i.e. being replaced by itself). If the time difference is above a predetermined threshold value, an alarm may be triggered at 470 and the process may return to step 405 for receiving data strings (i.e., no new string is stored in memory).

The alarm may indicate that no valid data has been received for a period of time that is above a predetermined threshold (i.e. the time lapse since the receipt of the last valid data is above a predetermined threshold value). Such a scenario may result due to the lack of reception of a signal from the vehicle because it is in a tunnel for example. It could also be due to a reduction in the number of satellites that are in communication with the vehicle. As a result, only valid data may be placed in memory 220.

Upon placing the present string (step 460) or rewriting the last valid string one more time (step 455), the location may be calculated at 465 based on the values currently stored in memory.

Exemplary embodiments as described herein increase the reliability of data used in computing the location of a vehicle. The increased reliability also lead to increased accuracy (relative to current methods) in determining the location of a vehicle.

It will be appreciated that procedures described above may be carried out repetitively as necessary to control determine location vehicle. To facilitate understanding, many aspects of the invention are described in terms of sequences of actions that can be performed by, for example, elements of a programmable computer system. It will be recognized that the various actions could be performed by specialized circuits (e.g., discrete logic gates interconnected to perform a specialized function or application-specific integrated circuits), by program instructions executed by one or more processors, or by a combination of both.

Moreover, the invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM, EEPROM, or Flash memory), an optical fiber, and a portable compact disc read-only memory (CD-ROM).

Thus, the invention may be embodied in many different forms, not all of which are described above, and all such forms are contemplated to be within the scope of the invention. It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method for determining vehicle location comprising:
   receiving data at a predetermined frequency;
   validating the received data;
   storing the received data based on the validation; and
   a processor computing a location based on the stored data, wherein the validation further comprises:
   verifying a presence of particular data substrings within the received data, said substrings including at least one of a GSA substring and a RMC substring;
   verifying a presence of a plurality of data fields within each data substring including fields representing at least a horizontal dilution of precision and a vertical dilution of precision;
   computing a probability factor by adding the horizontal dilution of precision and the vertical dilution of precision; and
   validating the probability factor by comparing the computed probability factor with a pre-defined threshold, wherein the probability factor is valid if it is less than the pre-defined threshold.

2. The method of claim 1, further comprising receiving the data at a central station remote from the vehicle.

3. The method of claim 1, further comprising:
   designating the received data as invalid data if the computed probability factor is greater than or equal to the pre-defined parameter threshold.

4. The method of claim 3, further comprising:
   measuring a time lapse since a storage of a last data; and
   overwriting the last stored data with the last stored data if the time lapse is less than a pre-defined time threshold.

5. The method of claim 4, further comprising:
   triggering a notification that a signal is not being received if the time lapse is equal to or greater than the pre-defined time threshold.

6. The method of claim 1, wherein the RMC substring includes fields representing at least latitude, longitude and time.

7. The method of claim 1, wherein storing the received data comprises storing sixteen discrete data strings.

8. The method of claim 7, further comprising receiving the data strings at one second intervals.

9. A system for determining vehicle location, the system comprising:
   a modem for receiving data;
   a processing means processor for determining validity of the received data and determining the vehicle location; and
   a memory for storing validated data, wherein
   the processor verifies a presence of particular data substrings within the received data, said substrings including at least one of a GSA substring and a RMC substring;

verifies a presence of a plurality of data fields within each data substring including fields representing at least a horizontal dilution of precision and a vertical dilution of precision;

computes a probability factor, by adding the horizontal dilution of precision and the vertical dilution of precision; and validates the probability factor by comparing the computed probability factor with a pre-defined parameter threshold, wherein the probability factor is valid if it is less than the pre-defined threshold.

10. The system of claim 9, wherein the processor verifies receipt of data corresponding to a NMEA-0183 standard.

11. The system of claim 9, wherein the processor compares the computed probability factor with the pre-defined threshold stored in the memory.

12. The system of claim 9, wherein the modem receives data from an electronic control unit of a vehicle.

13. The method of claim 1, wherein the received data is a NMEA-0183 data string.

14. The method of claim 1, further comprising:
storing the received data if the probability factor is valid.

* * * * *